(12) United States Patent
Wimmer et al.

(10) Patent No.: US 9,001,675 B2
(45) Date of Patent: Apr. 7, 2015

(54) COMMUNICATION METHOD AND SYSTEM

(75) Inventors: Wolfgang Wimmer, Rietheim (CH);
Hubert Kirrmann, Dättwil (CH);
Hermann Spiess, Habsburg (CH);
Stefan Ramseier, Kirchdorf (CH); Allen Notter, Lenzburg (CH); Martin Israel, Hubersdorf (CH)

(73) Assignee: ABB Technology AG, Zürich (CH)

( * ) Notice: Subject to any disclaimer, the term of this patent is extended or adjusted under 35 U.S.C. 154(b) by 110 days.

(21) Appl. No.: 13/181,709

(22) Filed: Jul. 13, 2011

(65) Prior Publication Data

US 2011/0286350 A1  Nov. 24, 2011

Related U.S. Application Data

(63) Continuation of application No. PCT/EP2010/050273, filed on Jan. 12, 2010.

(30) Foreign Application Priority Data

Jan. 15, 2009 (EP) ..................... 09150630

(51) Int. Cl.
*G01R 31/08* (2006.01)
*G08C 25/02* (2006.01)
*H04B 1/69* (2011.01)
(Continued)

(52) U.S. Cl.
CPC ............. *H04B 1/69* (2013.01); *H02H 1/0061* (2013.01); *H02H 7/261* (2013.01); *H04B 3/54* (2013.01); *H04B 2203/5458* (2013.01); *H04J 3/0667* (2013.01)

(58) Field of Classification Search
USPC .................................. 370/252, 509
See application file for complete search history.

(56) References Cited

U.S. PATENT DOCUMENTS

| | | |
|---|---|---|
| 2002/0105909 A1 | 8/2002 | Flanagan et al. |
| 2003/0081634 A1 | 5/2003 | Higinbotham et al. |

(Continued)

FOREIGN PATENT DOCUMENTS

WO      WO 94/03002 A1    2/1994

OTHER PUBLICATIONS

Apostolov, Implementation of accelerated transmission line protection schemes in substations with IEC 61850, Transmission and Distribution Conference and Exposition, (Apr. 2008).*

(Continued)

*Primary Examiner* — Michael Thier
*Assistant Examiner* — Brian Cox
(74) *Attorney, Agent, or Firm* — Buchanan Ingersoll & Rooney PC

(57) ABSTRACT

Exemplary embodiments increase reliability of communication over a non-deterministic communication channel, in electric power systems. A communication channel is monitored based on regular network traffic, by evaluating messages or data packets carrying real-time operational data as a payload. A permanent determination of a channel quality, including appropriate alarming in case the channel quality is found insufficient, is based on an evaluation, at a receiving node, of data packets continually transmitted by a sending node. These continually or repeatedly transmitted data packets can include identical payloads reflecting current states rather than state changes as operational data.

10 Claims, 1 Drawing Sheet

(51) Int. Cl.
  *H02H 1/00* (2006.01)
  *H02H 7/26* (2006.01)
  *H04B 3/54* (2006.01)
  *H04J 3/06* (2006.01)

(56) References Cited

U.S. PATENT DOCUMENTS

| | | | |
|---|---|---|---|
| 2003/0151871 A1* | 8/2003 | Schnyder | 361/91.1 |
| 2007/0230361 A1 | 10/2007 | Choudhury | |
| 2008/0170508 A1* | 7/2008 | Popiak et al. | 370/252 |
| 2008/0225841 A1* | 9/2008 | Conway et al. | 370/389 |
| 2009/0070871 A1* | 3/2009 | Poppe | 726/22 |

OTHER PUBLICATIONS

*International Search Report (PCT/ISA/210) issued on May 12, 2010, by European Patent Office as the International Searching Authority for International Application No. PCT/EP2010/050273.
*International Preliminary Report on Patentability (PCT/IPEA/409) issued on Mar. 15, 2011, by European Patent Office as the International Searching Authority for International Application No. PCT/EP2010/050273.
*Search Report issued on Oct. 12, 2009, by European Patent Office for Application No. 09150630.3.
*IEEE Standard 1588-2002, IEEE Standard for a Precision Clock Synchronization Protocol for Networked Measurement and Control Systems.

* cited by examiner

COMMUNICATION METHOD AND SYSTEM

RELATED APPLICATIONS

This application claims priority as a continuation application under 35 U.S.C. §120 to PCT/EP2010/050273, which was filed as an International Application on Jan. 12, 2010 designating the U.S., and which claims priority to European Application 09150630.3 filed in Europe on Jan. 15, 2009. The entire contents of these applications are hereby incorporated by reference in their entireties.

FIELD

The invention relates to communication in electric power utilities, such as communication of real-time operational data between distant sites of an electric power utility enterprise.

BACKGROUND

Electric power utilities or transmission system operators own and operate electric power transmission networks interconnecting sites, such as power sources and substations, which despite being distant from each other some 100 km or more, have to be coordinated in one way or the other. Across their utility communication systems, a variety of messages can be transferred between distant sites of the utility over long distance communication links in order to safely transmit and distribute electric energy. For some of these messages, and in particular for teleprotection commands, the transmission delay between transmitter and receiver can be critical and should not exceed a few milliseconds up to some 10 ms.

Dedicated remote tripping devices or protection signal transmission devices, also known as teleprotection devices, can be used for transmitting protection or switching commands for distance and differential protection schemes in electrical high-voltage and medium-voltage networks and systems. Protection commands result, for example, in a circuit breaker being opened directly or indirectly and, in consequence in electrical disconnection of a selected part of the network or of the system. Conversely, other protection commands result in the opening of a circuit breaker in the remote station being prevented or blocked. In order for a protection command to be transmitted from one point of a power transmission or distribution network to another, a transmitter in a remote tripping device produces signals in accordance with the protection command, which are transmitted via a physical signal link. A receiver in another remote tripping device detects the transmitted signals and determines the corresponding number and nature of the protection commands. The physical signal link can involve radio waves or fiber optics, however generally, the protection signals are transmitted over pilot wires, analog leased lines, voice channels of analog or digital communication systems, or even high-voltage electricity transmission lines, the latter being known as power line communication (PLC).

US 2003/081634 A1 is directed to conventional audio tone teleprotection via a dedicated audio telecommunication link between two substations. This technology includes time division multiplexed frames being transmitted continuously from a sender to a receiver in a deterministic manner. At the sender, a special framing pattern (pre-selected pattern of 8 bits) is inserted in the last timeslot of each frame, thus decreasing bandwidth available for operational data. If the known framing pattern is not detected repeatedly at the receiver override information signals are inserted into the de-framed data stream to prevent a noise signal from producing a false output state.

For transmitting messages over long distances from one site to the other, the utility may rely on public or proprietary communication networks with non-deterministic behaviour. In this implementation, a Wide-Area communication Network (WAN) designates a packet switched communication network interconnecting two sites of the utility, and including a number of IP networks with specific network elements such as routers, switches, repeaters and possibly optical transmission media at the physical layer. WANs are in general very reliable, however the network elements can cause irregular network delays, occasional bit errors and inherent link failures, which all contribute to a non-deterministic behaviour of the network. In packet switched networks with individual data packets carrying destination addresses, heavy load on a communication channel or a specific network element can lead to increased delay or packet loss, whereas link failure can cause delays due to reconfiguration of the routers.

For time-critical applications, increased delay or packet loss can result in a malfunction of a system. For an electric power utility, in the worst case, substantial damage to a substation can occur if a trip signal is delayed. WANs can also be a target of unlikely, but potentially harmful acts of intrusion including e.g., inserting intentionally wrong commands at one of the routers. As a consequence, any communication channel involving a WAN may be considered both non-deterministic, or non-synchronous, and non-secure. Use of non-deterministic communications for command and control means that one can not guarantee delivery nor the actual communication path taken by a packet. Specifically, the use of the Internet increases the risk of critical control system communications failure, as attacks against other entities could greatly impact any control communications that uses this path or shares resources that touch the Internet.

Known dedicated teleprotection systems monitor the state and delay of a communication system by means of dedicated loop test messages that operate as follows: two stations, A and B, are connected via a communication link. Station A transmits a special message to station B, which receives it and immediately sends back an "echo" to station A. When station A receives this "echo", it knows that the communication link is working, and it can also measure the transmission delay (half the time it takes the loop test message to travel from A to B and back to A). A loop test message can be sent once every few hours. As a result, changes of the transmission delay in real-time can not be detected.

Alternatively, the delay measurement method specified in IEEE 1588 (IEEE Standard 1588-2002, IEEE Standard for a Precision Clock Synchronization Protocol for Networked Measurement and Control Systems, (e.g., Precision Time Protocol PTP)) can be used to monitor a state and/or availability of a communication system. Standard two-way time synchronization protocols such as IEEE 1588 define methods for synchronising devices via a communication network such as a Local Area Network (LAN), to a higher precision (e.g., better than one microsecond).

In the field of Voice over IP (VoIP), voice calls are routed over an Internet Protocol (IP) network, and a Quality of Service (QoS) is an important issue between the service provider and the end user. In this context, and more generally for the purpose of real-time data transmission, the Real-Time Protocol (RTP) within the ISO-OSI layer reference model prescribes the encapsulation of e.g. encoded voice data in RTP packets. The latter are passed to the transport layer and further to the Internet Protocol (IP) network layer. At the transport layer, data transmission systems may use either a reliable protocol (such as a Transmission Control Protocol TCP) or an unreliable protocol (such as User Datagram Protocol UDP). The former ensures that all the packets arrive at the receiver, but specifies more bandwidth due to protocol overhead and it introduces more delay. The reliable transport protocols normally measure the round-trip delay in order to derive there from when messages should be repeated. On the other hand, unreliable protocols are lightweight and faster although the data stream can be subject to packet loss.

In US 2007/0230361 A1, a method is provided for monitoring a packet-switched network via which real time VoIP data is transmitted. Data packets containing real-time data are sniffed in order to monitor a QoS parameter. The QoS parameter includes one of egress delay, ingress delay, jitter, roundtrip delay, packet loss, throughput, instantaneous signal loss, and accumulated content loss. In another patent application US 2002/105909 related to VoIP, as long as the smoothing algorithm, which adjusts for transitory effects while evaluating packet loss data, yields acceptable values, calls continue to be routed over the IP network. If, on the other hand, the value exceeds a threshold, a QoS Monitor blocks routing over the IP network and routes calls over an alternative network, such as a Switched Circuit Network (SCN).

SUMMARY

An exemplary method of communicating between a first communication node at a first site and a second communication node at a second site is disclosed. The method comprising: sending, by the first communication node, a message including operational data over a communication channel to the second communication node, and monitoring a channel quality of the communication channel based on the message; sending continually, by the first communication node, data packets including operational data over a non-deterministic communication channel including a packet-switched network to the second communication node; and monitoring, by the second communication node and based on said data packets, the channel quality.

An exemplary communication system with a first communication node, a second communication node, and a non-deterministic communication channel, for performing a communication method comprising: sending, by the first communication node, a message including operational data over a communication channel to the second communication node, and monitoring a channel quality of the communication channel based on the message; sending continually, by the first communication node, data packets including operational data over a non-deterministic communication channel including a packet-switched network to the second communication node; and monitoring, by the second communication node and based on said data packets, the channel quality.

DESCRIPTION OF THE DRAWINGS

The subject matter of the invention will be explained in more detail in the following text with reference to preferred exemplary embodiments which are illustrated in the attached drawings, in which.

The reference symbols used in the drawings, and their meanings, are listed in summary form in the list of reference symbols. In principle, identical parts are provided with the same reference symbols in the figures.

DETAILED DESCRIPTION

Figure 1:
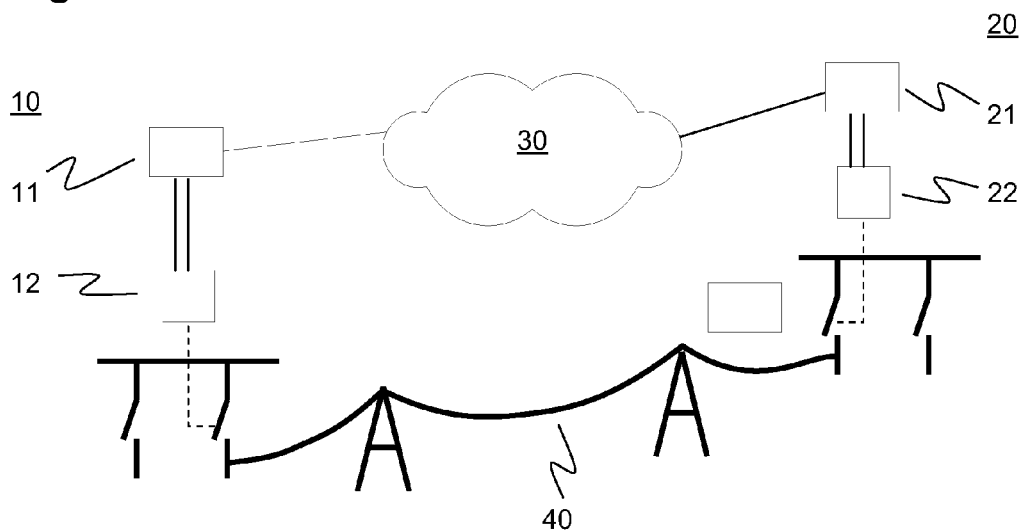
FIG. 1 illustrates a utility communication network in accordance with an exemplary embodiment.

It is therefore an objective of the invention to enable a utility, in particular an electric power utility, to make efficient use of non-deterministic communication channels for exchanging real-time operational data between distant sites of the utility.

According to an exemplary embodiment of the present disclosure, a non-deterministic communication channel including a Wide Area Network (WAN) with packet switched communication, such as an Internet Protocol (IP) network, can be monitored based on regular network traffic, i.e. by evaluating continually sent data packets carrying real-time operational data as a payload. Hence, no permanent occupation of bandwidth in a deterministic communication channel is specified, nor is there any additional overhead network traffic in the form of test messages or message duplicates generated on the non-deterministic channel, and a minimum usage of, or interference with, the communication channel can be achieved. A permanent determination and monitoring of a channel quality, including appropriate alarming in case the channel quality is found insufficient, is based on an evaluation, at a receiving node, of data packets continually transmitted by a sending node. These continually or repeatedly transmitted data packets can include, as operational data, identical payloads reflecting current states rather than state changes. Ultimately, the reliability of a communication over a non-deterministic channel without message confirmation is increased.

The communication method is most beneficially used in an electric power system, where the data packets include protection commands to protect a power line between two sites of the electric power system, and where a site is a power source, a power sink, or a substation. The protection of the power line may be a distance or differential protection scheme, and result e.g. in a blocking, unblocking, or permissive state of a switching device at the remote site. The repeatedly transmitted data packets can be seen as replacing a conventional guard signal in conventional teleprotection channels.

In another exemplary embodiment of the present disclosure, the receiving node determines channel availability as a binary and rapidly updatable channel quality measure. Hence, the receiving node verifies whether data packets with the expected type of payload are actually received, and whether the delay in-between successively received data packets is in the expected range. If the time elapsed between successive data packets exceeds a certain threshold, the channel availability is, at least temporarily, considered insufficient. Appropriate measures can then be taken at the receiving node, such as alarm generation, conversion to a stand-alone or island operation mode, or, in case a signal is deemed missing, a switching device at the second site being unblocked.

In an exemplary embodiment, the proposed protocol for payload transmission and channel supervision includes, in the data packets, a send sequence number. Send sequence numbers can be a suitable substitute for time stamps because of possible irregularities in the time source at the sender due to e.g. clock synchronisation, manual time setting or daylight savings time. By proper monitoring of the sequence numbers, several types of channel errors can be detected and logged, such as packet loss, packet duplication and reception of packets in the wrong order, i.e. not in the order in which they had been dispatched. All these errors can indicate a degrading channel quality in the WAN.

In another exemplary embodiment, the data packet includes a response request flag. If the latter is set, a response message is prepared by a destination node of the original data packet and immediately returned to the source or originating node. The response message includes the received "send sequence number". By measuring the elapsed time between the transmission of a response request and the reception of a response message as identified by the same send sequence number, the source node can estimate a round trip delay or time of the communication channel. If this permanent response time measurement then detects a delay that exceeds a configurable threshold, an alarm is generated informing the user that the quality of the non-deterministic communication channel is no longer guaranteed, and that a different communication channel should be chosen, or that the message contents should be temporarily ignored.

In an exemplary embodiment of the present disclosure, the sending node is connected to a relay at the first site or substation, and permanently transmits a state received from the latter. In the event of a changed state or signal being input to the node, and in order to convey the new information as fast as possible, the repetition rate or transmit frequency of the data packets carrying the new state is increased, at least temporarily. For example, N=16 repeats at an increased rate of one message every 2 ms can be generated, before returning to a standard rate of one maintenance message every 5 ms.

Cyber security aspects of the proposed transmission over non-secure communication channels can be taken care of by a hash or message digest that is transmitted as part of the data packet and calculated based on the header and payload fields. The hash enables to verify the authenticity of the data packet, and thus provides, if needed in combination with the sequence number and node address, for a basic protection against various security threats.

The exemplary embodiments of the present disclosure can be implemented in a peer-to-peer fashion in both communication nodes, such that each node can independently measure the channel quality and signal alarms.

FIG. 1 illustrates a utility communication network in accordance with an exemplary embodiment. The network includes a first node or terminal 11, a second node or terminal 21, and a Wide Area Network (WAN) 30 as part of a non-deterministic communication channel, e.g. based on User Datagram Protocol (UDP) with unacknowledged transmission between the two nodes. The two nodes 11, 21 can be dedicated teleprotection devices located at a first substation 10 and at a second substation 20, respectively, and hardwired to a number of protection relays 12, 22 or other secondary equipment of the respective substation. The two nodes 11, 21 can be interconnected via other communication channels, such as a Power Line Communication (PLC) channel along an overhead power line 40 between the two substations 10, 20. The relays 12, 22 in turn are connected to the primary equipment of the substation and provide a signal or state to be transmitted, e.g. a tripping signal or command related to a distance protection function of the overhead power line 40.

Figure 2:
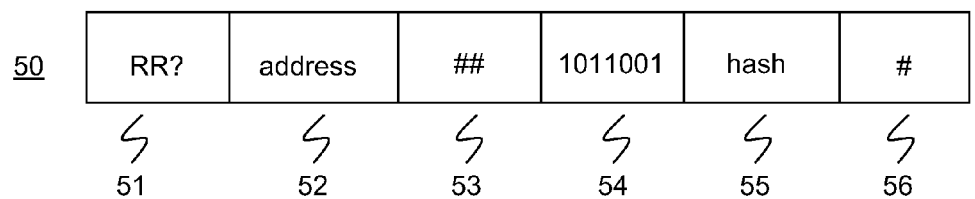
FIG. 2 illustrates the content of data packet in accordance with an exemplary embodiment.

FIG. 2 illustrates the content of data packet in accordance with an exemplary embodiment. FIG. 2 shows an excerpt of an exemplary data packet 50 to be sent, by the first node 11, across the non-deterministic communication channel 30 to the second node 21. The data packet includes a header, payload and trailer as part of a teleprotection application layer. The header includes, among other fields, special header fields with a Response-Request flag 51, a teleprotection Node Address 52, and a send sequence number 53. The payload field 54 includes one or several signals or protection commands in the form of a relatively short bit sequence. It is followed by a first trailer field with a message digest or hash 55 calculated based on the header and payload fields. The hash provides for a basic protection against, and enables, if needed in combination with the sequence number 53 and node address 52, detection of various security threats, e.g. unauthorized (faked) messages, wrong partner, man-in-the-middle, or message replay. Further trailer fields may follow, such as a retransmission count 56 that is incremented in case of a retransmission, at an increased repetition rate and following a particular event, of otherwise unchanged data packets with identical sequence number and hash. The application layer data can be embedded in headers and trailers according to the OSI transport (UDP) network (IP) and physical (Ethernet) layers (not shown in FIG. 2).

Figure 3:
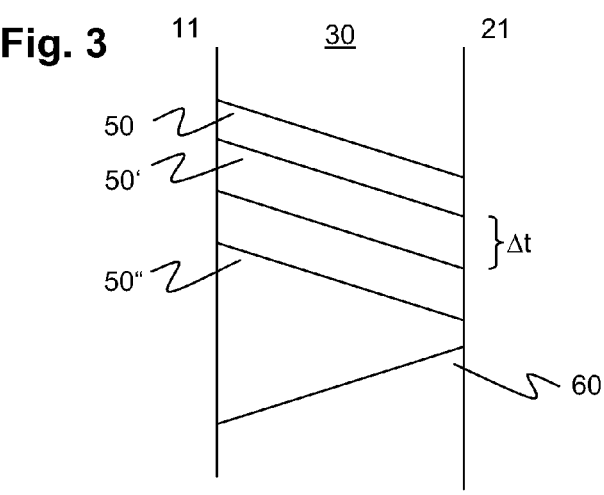
FIG. 3 illustrates a sequence of maintenance packets and one response packet in accordance with an exemplary embodiment.

FIG. 3 illustrates a sequence of maintenance packets and one response packet in accordance with an exemplary embodiment. FIG. 3 shows an exemplary sequence of messages 50, 50', 50" exchanged between nodes 11 and 21, where time is progressing from top to bottom, and where each diagonal represents a single message. The first node 11 continually sends data packets at regular intervals separated by idle periods with no sending activity, e.g. every 5 ms. The data packets can be received by the second node 21, and as long as the messages are received in order, and/or with the expected inter-message delays Δt, the channel 30 is assumed to be available, and the payload conveyed by the messages is duly evaluated at the receiving end. Occasionally, the response request flag 54 in the data packet 50" is set, upon which the second node responds with a response message 60. The reception of the latter at the first node, and in particular a round trip time delay including the cumulated transmission times, or delays, of the response-requesting data packet 50" and the response message 60, in turn can be evaluated in view of a channel quality. The response requests are sent periodically, but at a much lower rate (e.g. every 100 ms to 10 sec) than the data packets without a response request.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS 10, 20 substation
11, 21 node
12, 22 relay
30 WAN
40 power line
50 data packet
51 response request flag
52 node address
53 sequence number
54 payload
55 hash
56 retransmission count
60 response message

What is claimed is:

1. A method of communicating between a first communication node at a first site and a second communication node at a second site, wherein the first communication node is adapted to receive a protection command as an input signal from a relay connected to the first node, the method comprising:

sending, by the first communication node, a message including operational data over a communication channel to the second communication node, and monitoring a channel quality of the communication channel based on the message;

sending continually, by the first communication node, data packets including operational data over a non-deterministic communication channel including a packet-switched network to the second communication node;

verifying, by the second communication node, whether data packets with an expected type of payload are received;

monitoring, by the second communication node and based on said data packets, the channel quality; and increasing, as soon as the input signal from the relay is received, a repetition rate of the continually sent data packets.

2. The method according to claim 1, wherein the two sites are connected via a power line of an electric power transmission network, the method comprising:

continually sending data packets having operational data in a form of protection commands for the power line.

3. The method according to claim 1, comprising:

determining, by the second node, a channel availability based on an expected and an observed reception of data packets.

4. The method according to claim 3, comprising:

determining the channel availability based on an inter-message time delay $\Delta t$ between two successively sent data packets.

5. The method according to claim 3, wherein the data packets include a send sequence number, the method comprising:

determining the channel availability based on the send sequence numbers of the received data packets.

6. The method according to claim 1, wherein the data packets include a response request flag, the method comprising:

responding, by the second communication node and if the response request flag of a received data packet is set, with a response message, and determining, by the first communication node, a channel quality based on the response message.

7. The method according to claim 6, comprising:

determining the channel quality based on a round trip time delay of the data packet with the response request flag being set and the response message.

8. The method according to claim 1, wherein the data packets include a hash, the method comprising:

determining, by the second communication node and based on the hash, whether the data packet is authentic.

9. The method according to claim 1, wherein the data packets are sent by the first communication node continually at regular intervals separated by idle periods with no sending activity.

10. A communication system with a first communication node, a second communication node, and a non-deterministic communication channel, for performing a communication method according to claim 1.

* * * * *